United States Patent [19]

Collins et al.

[11] 4,148,682
[45] Apr. 10, 1979

[54] FLUID EXPANDABLE TIRE BUILDING DRUM

[75] Inventors: Marcus H. Collins, Akron; Kiritkumar R. Patel, Broadview Heights, both of Ohio

[73] Assignee: Eaton Corporation, Cleveland, Ohio

[21] Appl. No.: 813,153

[22] Filed: Jul. 5, 1977

[51] Int. Cl.² .......................................... B29H 17/16
[52] U.S. Cl. ......................................... 156/416; 92/92
[58] Field of Search ............... 156/123, 126, 127, 128, 156/129, 133, 394, 414–420; 92/92, 98 R, 99, 100, 103 F, 103 SD; 152/350, 169, 172, 179, 182, 208, 216, 223, 228

[56] References Cited

U.S. PATENT DOCUMENTS

| 1,785,659 | 12/1930 | State | 156/126 |
|---|---|---|---|
| 2,251,445 | 8/1941 | Fawick | 92/92 |
| 2,386,610 | 10/1945 | Hunter | 92/92 |
| 2,614,951 | 10/1952 | Iredell | 156/416 |
| 2,708,994 | 5/1955 | Kraft | 92/92 |
| 2,713,373 | 7/1955 | Daugherty | 156/113 |
| 3,018,213 | 1/1962 | Kraft | 156/416 |
| 3,154,455 | 10/1964 | Nebout | 156/133 |
| 3,188,260 | 6/1965 | Nebout | 156/415 |
| 3,475,254 | 10/1969 | Henley | 156/401 |
| 3,531,356 | 9/1970 | Henley | 156/416 |
| 3,607,558 | 9/1971 | Nebout | 156/417 |
| 3,784,437 | 1/1974 | Appleby et al. | 156/401 |
| 3,990,930 | 11/1976 | Schmit | 156/123 |

FOREIGN PATENT DOCUMENTS

| 1446490 | 6/1966 | France | 156/416 |
|---|---|---|---|
| 1000262 | 8/1965 | United Kingdom | 156/416 |

OTHER PUBLICATIONS

"Airflex" Catalog and Bulletin CB-401, Clutches and Brakes by Eaton Corp., Cleveland, Ohio, Jan. 1, 1978.

Primary Examiner—John E. Kittle
Attorney, Agent, or Firm—M. L. Union

[57] ABSTRACT

A fluid expandable drum for building portions of tires in a tire building machine includes an annular supporting drum and an expandable annular tube element having an inner peripheral surface supported on the annular drum. The tube element includes an outer peripheral surface upon which building means is secured for movement therewith. The building means define an annular building surface thereon which is movable in a radial direction toward and away from the annular support drum upon contraction and expansion, respectively, of the tube element. The tube element is expanded to expand the diameter of the building surface to enable a tire portion to be built thereon and retracted to decrease the diameter of the building surface to enable a built tire portion to be removed therefrom. The tube element includes a radial ply extending around the cross-sectional circumference of the tube elements and a radial ply band extending around the outer peripheral surface of the tube element adjacent the building means to increase the strength and resiliency of the outer peripheral surface to enable the building means to decrease the diameter of the building surface upon contraction of the tube element without the need for auxiliary springs.

8 Claims, 3 Drawing Figures

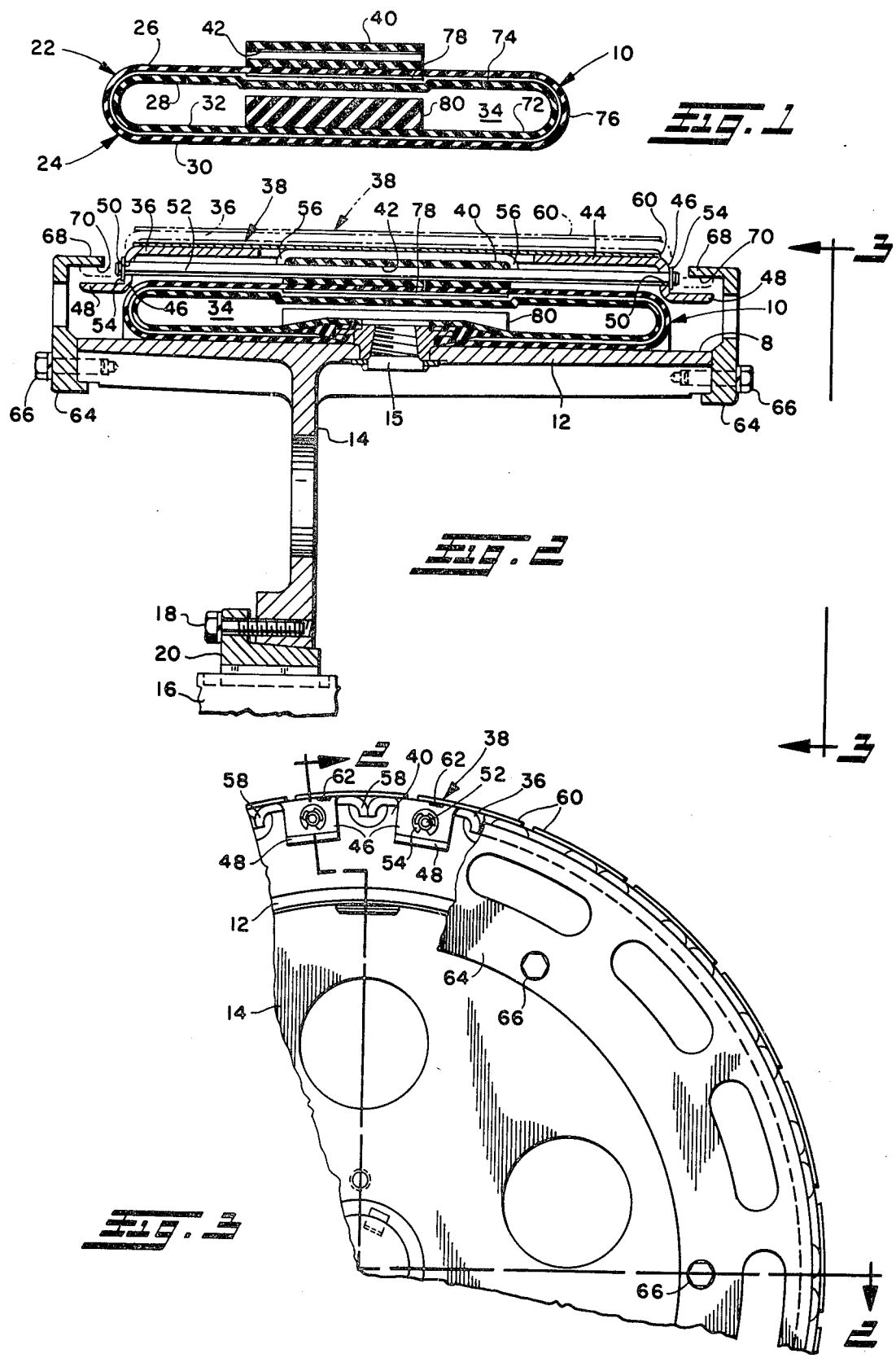

FLUID EXPANDABLE TIRE BUILDING DRUM

PRIOR ART STATEMENT

The following references are considered to be relevent to the present invention:

U.S. Pat. No. 3,784,437; Appleby, et al.
U.S. Pat. No. 3,475,254; Henley

U.S. Pat. No. 3,784,437 discloses a tire building apparatus wherein the expandable bladders include, in addition to two plies of rubber compounds, an intermediate ply with substantially inextensible tire cord oriented at 90°, a radially outer ply of substantially inextendable tire cord at 88° and a radial interply of substantially inextensible tire cord also at 88° being at a 40° angle with the outer ply.

U.S. Pat. No. 3,475,254 discloses a tire building machine including a shaping bladder used on a building drum to expand the tire carcass to a toric shape. This bladder is constructed of a plurality of plies of unreinforced elastomeric material wrapped around to form an enclosed inflation chamber. The portion of the bladder that is disposed in contact with the gap shields and segments of the tire building drum is reinforced with a single ply of elastomeric material having cords embedded therein running in a substantially axial direction which serve to resist undesirable axial expansion of the bladder during inflation.

BACKGROUND OF THE INVENTION

1. Field of the Invention

The present invention relates to a fluid expandable drum for building a tread and a radial tread ply band in a tire building machine and more particularly to a fluid expandable drum which includes an annular building surface which is movable in a radial direction upon expansion and contraction of the tube element. The tube element includes a radial ply and a radial ply band extending around the outer peripheral surface to increase the strength and resiliency of the outer peripheral surface to enable the building surface to decrease in diameter upon contraction of the tube element without the need of auxiliary springs.

2. Background of the Invention

Fluid expandable drums for building tires are well known in the art. An example of known tire building machinery is disclosed in the Henley U.S. Pat. No. 3,475,254; the Appleby, et al. U.S. Pat. No. 3,784,437; and the Iredell U.S. Pat. No. 2,614,951. Also, machines such as the NRM model R1016 Second Stage Radial Tire Building Machine have also been used in the art for the construction of tires.

Some known tire building machines generally utilize a tire building drum wherein a plurality of shoe means are utilized to form the tire building surface. The shoe means are biased outwardly in a radial direction upon expansion of a fluid expandable element. Spring means are provided to retract the shoes and decrease the diameter of the tire building surface upon contraction of the tube element. Such a construction is shown in the Henley U.S. Pat. No. 3,474,254 wherein the springs 160 are utilized to urge the gap shields 161 inwardly, and the Iredell U.S. Pat. No. 2,614,951 wherein springs 22 urge the segments 6 in an inwardly direction. The use of spring means to return the shoes and the building surface to their contracted position increases the cost, complexity and reliability of the known tire building mechanisms. Moreover, the use of such springs considerably increases the difficulties in replacing an expandable tube element in the tire building machine due to the fact that all of the spring means must be released before the tube element can be replaced.

SUMMARY OF THE INVENTION

The present invention provides a new and improved fluid expandable drum for building a tread and a radial tread ply band in a tire building machine including an annular supporting drum and an expandable annular tube element having an inner peripheral surface supported on the annular support drum and an outer peripheral surface. Building means is associated with the outer peripheral surface of the tube element and defines an annular building surface which is movable in a radial direction toward and away from the annular support drum upon the contraction and expansion, respectively, of the tube element. The tube element is expanded to expand the diameter of the building surface to enable a tread and a radial tread ply band to be built thereon and retracted to decrease the diameter of the building surface to enable a built tread and radial tread ply band to be removed therefrom. The tube includes a radial ply extending around the cross-sectional circumference thereof and a radial ply band extending around the outer peripheral surface thereof to increase the strength and resiliency of the outer peripheral surface to enable the annular building surface to decrease in diameter upon contraction of the tube element without the need for auxiliary return springs.

The present invention further provides a new and improved annular fluid expandable tube element for use with an annular drum for building portions of tires in a tire building machine including a lower wall portion having an inner surface and an outer surface adapted to be supported on the drum and an upper wall portion having an inner surface and an outer surface. The upper wall portion is movable radially outwardly from the lower wall portion upon expansion of the tube element and is movable radially toward the lower wall portion upon contraction of the tube element. Support means are movable with the outer surface of the upper wall portion. The support means define an annular building surface which is movable in a radial direction away from the drum upon expansion of the tube element to expand the diameter of the building surface to enable a portion of a tire to be built thereon and movable in a radial direction toward the drum upon contraction of the tube element to decrease the diameter of the building surface to enable a built tire portion to be removed therefrom. A radial ply extends around the transverse cross-sectional circumference of the tube element and a radial ply band extends around the circumference of the tube element in the upper wall portion to increase the strength and resiliency of the outer surface of the upper wall portion to enable the support means to decrease the diameter of the building surface upon contraction of the tube element without the need for auxiliary springs.

DESCRIPTION OF THE DRAWINGS

FIG. 1 is a cross-sectional view of the annular fluid expandable tube element of the present invention.

FIG. 2 is a cross-sectional view of the annular fluid expandable tube element of the present invention illustrating the annular support drum upon which the tube is supported and the shoe means for defining the building surface.

FIG. 3 is a side view taken approximately along the lines 3—3 of FIG. 2 more fully illustrating the annular drum and tube element and including a fragmentary showing of the retainer ring.

DESCRIPTION OF THE PREFERRED EMBODIMENT

Referring to the figures, an expandable tube element 10 for use in a tire building machine is illustrated. The tube element 10 is shown in FIGS. 2 and 3 supported on the outer annular peripheral surface 8 of a tire building drum 12 which is normally supported in a tire building machine not illustrated. The tire building drum 12 includes a flange portion 14 which is secured to a shaft 16 for rotation therewith by a bolt 18 and tapered bushing 20. Suitable well-known means are provided in the tire building machine to effect rotation of shaft 16 and, hence, drum 12 to enable a tire portion, in the preferred embodiment a tread and a radial tread ply band, to be built thereon.

The tube element 10 includes an upper wall portion 22 and a lower wall portion 24. The upper wall portion 22 includes an outer peripheral surface 26 and an inner interior surface 28 and the lower wall portion 24 includes an outer peripheral surface 30 and an inner surface 32. The outer peripheral surface 30 of the lower wall portion 24 is adapted to be supported on the annular peripheral surface 8 of the drum 12 for rotation therewith. The tube element 10 has a contracted condition as is illustrated in full lines in FIG. 2 and an expanded condition, illustrated in phantom lines in FIG. 2 in which a fluid, such as air, is introduced through a valve 15 into the cavity 34 to effect radial movement of the upper wall portion 22 away from the drum 12 and lower wall portion 24.

Secured to the upper wall portion 22 are a plurality of shoe members 36 which in part define an annular tire building surface 38 upon which portions of tires are constructed. Expansion of the tube element 10 effects an increase in diameter of the annular tire building surface 38 and contraction of the tube element 10 effects a decrease in diameter of the tire building surface 38.

The outer peripheral surface 26 of the upper wall portion 22 includes a plurality of support blocks 40 which may be bonded thereto or formed integrally therewith in an annular array. The support blocks 40 each include a cylindrical opening 42 disposed therein which enables a shoe member 36 to be attached thereto. It should be appreciated that each of the support blocks 40 has one shoe member 36 affixed thereto for movement therewith.

Each of the shoe members 36 include a planar portion 44 and a pair of side portions 46 which extend substantially perpendicular from the planar portion 44. A flange 48 extends from each of the side portions 46 in an outwardly direction. Each of the side portions 46 includes an opening 50 therein which is adapted to receive a rod member 52 therein. The rod member 52 extends through the openings 50 in the side portions 46 of the shoe 36 and passes through the opening 42 in the support block 40 to interconnect the shoe 36 and the support block 40. Suitable means, such as the E-clips 54, are provided to secure the rod 52, relative to the shoe 36 and support block 40, once rod 52 is passed through the openings 50 and 42. The rod 52 connects the shoe member 36 to the support block 40 disposed on the tube element 10 so that the shoe member 36 moves radially inwardly and outwardly upon contraction and expansion, respectively, of the tube element 10 without the need for auxiliary return springs.

Each of the shoe members 36 includes punched tabs 56 in the planar surface 44 which are disposed apart a distance equal to the width of the support block 40. The tabs 56 engage the upper corners of the support block 40 to center and support the shoe member 36 relative to the support block 40. As is more fully illustrated in FIG. 3, each of the shoe members 36 includes radially projecting side portions 58 at the edges thereof.

Secured to the planar surface 44 of each of the plurality of shoe members 36 is a gap plate 60. Each of the gap plates 60 is secured via a weld 62 to the surface 44 of a shoe member 36. It should be apparent from FIG. 3 that the gap plates 60 are not centrally located on the surface 44 of the shoe members 36. Rather, the gap plates are offset relative to the shoe members 36 so that the gap plates 60 extend across the gaps formed by the radially projecting side portions 58 of adjacent shoe members 36. Upon expansion of the tube element 10, the shoe members 36 move in a radially outwardly direction causing the planar surface 44 of each of the shoe members 36 to move apart thereby accentuating the space or gap formed between the side portions 58 of adjacent shoe members 36. The plurality of planar surfaces 44 cooperate to define the annular building surface 38 upon which the tire portion is built and the gap plates 60 cooperate with the planar surfaces 44 to define a substantially continuous annular building surface 38 around the exterior of the drum 12. When the tube 10 is expanded, the shoe members 36 move radially outwardly causing the gap plates 60 to slide in a tangential direction as the building surface 38 expands. The gap plates 60 are of sufficient length so that when the tube element 10 reaches its fully expanded condition, the gap plates still cover the gaps formed by the adjacent side portions 58 of the shoe members 36. The gap plates 60 form the building surface 38 upon which a portion of a tire is built. It should be apparent that the gap plates 60 and the planar surfaces 44 provide a substantially continuous annular building surface 38 about the periphery of the drum 12 when the tube element 10 is in its expanded and contracted condition.

In the present embodiment, the expandable drum 12, as illustrated in the figures, is utilized for building a tread and a radial tread ply band. The tread and radial tread ply band are utilized in producing radial tires and are subsequently combined with a tread portion and cured to form the tire. The plys of the tread and radial tread ply band are placed on the building surface 38 when the tube element 10 is in its expanded condition. This controls the size of the tread and radial tread ply band. After the tread and radial tread ply band have been completed, the tube element 10 is contracted thereby contracting the shoe members 36 and the building surface 38. Contraction of the building surface 38 causes the gap plates 60 to slide in a tangential direction over the planar surfaces 44 as the diameter of the building surface 38 decreases. The tangential movement of the gap plates 60 upon contraction of tube element 10 loosens the built tread and radial tread ply band from the building surface 38 so that it can be removed for a subsequent operation.

The diameter of the tread and radial tread ply band formed on the building surface 38 is extremely critical. Accordingly, a pair of annular retainer rings 64 are secured to the sides of the annular drum 12 via bolt members 66. The retainer rings 64 include an inwardly projecting flange member 68 which includes an interior surface 70. The surface 70 of each of the retainer rings 64 is adapted to engage with the flanges 48 disposed on either side of the shoe member 36 to limit the radial movement of the shoe member 36 upon expansion of the tube element 10 and fix the diameter of the building surface 38 when the tube element 10 is expanded. It should be apparent that various retainer rings 64 could be utilized to vary the size of the building surface to build various sized tread and radial tread ply bands. The retainer rings 64 are easily replaceable by removing the bolts 66.

The tube element 10, as is more fully illustrated in FIG. 1, includes a rubber inner tube 72 which is preferably formed from neoprene. Bonded to the outside of the rubber inner tube is a radial ply 74. Bonded to the radial ply 74 is a rubber cover 76 which is also preferably formed from neoprene. (Rubber and neoprene will be used interchangeably in the specification, and it is Applicant's intention that both of these terms be considered generic for rubber or rubber-like resilient coatings.) Disposed between the cover 76 and the radial ply 74 adjacent the annular array of support blocks 40, is a radial ply band 78. The radial ply band 78 has an annular shape and extends around the circumference of the tube element 10 beneath the support blocks 40. The radial ply band 78 differs from the radial ply 74 in that the radial ply band 78 is an annular band which only extends in the upper wall portion 22 adjacent the support blocks 40 while the radial ply 74 has a conventional construction and extends throughout the entire wall portion of the tube element. The radial ply band 78 provides resiliency and adds strength to the upper wall portion 22 of the tube element 10. The provision of the radial ply band 78 enables the tube element 10 to contract to its original position and, thus, move the shoe members 36 and the building surface 38 in a radially inwardly direction without the need for auxiliary springs due to the strength and resiliency added by the band 78.

The construction of the tube element 10 enables the tube to withstand a 30% circumferential strain which occurs upon expansion of the tube element 10 to various diameters as the retainer rings 64 are varied to enable the apparatus to be utilized to construct various sized tires. It should be appreciated that upon expansion of the tube element 10, the side portions thereof must be resilient to provide for a uniform expansion to various diameters of the tube while the tube must have enough strength to support the support blocks 40 and the shoe members 36 for movement therewith and while a tread and a radial tread ply is constructed on the building surface 38. Thus, the combination of the radial ply 74 for adding overall strength to the tube and the radial ply band 78 for adding strength and resiliency in the upper portion 22 of the tube element 10 is desirable. Such a construction provides the required strength in the building surface 38 while not making the tube so stiff that it would not withstand a 30% circumferential strain upon expansion. Additionally, a minimum durometer rubber is preferably used to reduce local stresses in the corners or sides of the tube element 10.

A filler block 80 is secured to the inner surface 32 of the lower portion 24 of the tube element 10. The filler block 80 is preferably made of rubber or neoprene and acts to stiffen the lower wall portion 24 of the tube element 10 and decrease the volume of fluid needed to be directed to the chamber 34 to effect expansion of the tube element 10. The filler block 80 acts like a rubber band in tension to hold the center of the lower wall portion 24 against the surface 8 of the drum 12. This prevents the tube 10 from rolling on the surface 8 upon expansion due to a slight nonsymetrical construction of the tube 10 caused by manufacturing inaccuracies. The filler block 80 also prevents sagging of the upper wall portion 26 when it is disposed below the lower wall portion 24 by adding rigidity to the lower wall portion 24. When the tube element 10 is placed on the annular drum 12, the lower half of the tube element, not illustrated, will have the shoe members 36 essentially hanging from the bottom portion of the annular tube member 10 and the lower wall portion 24 will be disposed vertically above the upper wall portion 26. If the filler block 80 were not provided, the weight of the shoe members 36 would cause the upper wall portion 26 of the lower half of the tube 10 to sag due to the weight of the shoe members 36 acting thereon which would also pull downwardly on the lower wall portion 24. This downward pull on the lower wall portion 24 would cause the lower wall portion 24 to sag if not for the force of the filler block 80 acting thereon in a direction tending to bias the tube to the surface 8 of drum 12. Thus, the filler block 80 acts to add rigidity to the lower wall portion 24 and prevent sagging of the upper wall portion 26 of the lower half of the tube 10. Additionally, the filler block 80 acts as a stop to limit the inward radial movement of the upper wall portion 26 to maintain substantial concentricity of the upper wall 26 relative to the surface 8 of drum 10.

From the foregoing, it should be apparent that a new and improved fluid expandable drum for building tread and radial tread ply bands in a tire building machine has been provided. The fluid expandable drum includes an outer surface 8 for supporting an expandable tube element 10 having an inner peripheral surface 30 supported on the annular outer surface 8 of the drum 12. A support block 40 is secured to the outer peripheral surface of the upper wall portion 26 of the tube element 10 and a plurality of shoe members 36 are connected to the support member 40 by the rods 52 for movement with the support blocks 40. The shoe members 36 define an annular building surface 38 which is movable in a radial direction relative to the drum 12 upon expansion and contraction of the tube element. The tube element includes a radial ply extending around the cross-sectional circumference of the tube element and a radial ply band extending around the outer peripheral surface adjacent the support blocks to increase the strength and resiliency of the outer peripheral surface to enable the shoe means to decrease the diameter of the building surface upon contraction of the tube element without the need for auxiliary springs.

We claim:

1. A fluid expandable drum for building a tread and a radial tread ply band in a tire building machine comprising an annular support drum having an annular outer surface thereon, an expandable annular tube element having an inner peripheral surface supported on said annular outer surface of said support drum and an outer annular peripheral surface, building means movable with said outer annular peripheral surface of the tube element and defining an annular building surface thereon which is movable in a radial direction toward and away from said annular support drum upon contraction and expansion, respectively, of said tube element, said tube element being expanded to expand the diameter of said building surface to enable a tread and a radial tread ply band to be built thereon and contracted to decrease the diameter of said building surface to enable a built tread and radial tread ply band to be removed therefrom, said tube element including a radial ply extending around the cross-sectional circumference of the tube element and a radial ply band extending around said outer peripheral surface of said tube element to increase the strength and resiliency of the outer peripheral surface to enable said building surface defined by said building means to decrease in diameter upon contraction of said tube element, said tube element further including an inner interior surface, an outer interior surface, and an annular filler block disposed on said inner interior surface for decreasing the volume of said tube element to decrease the volume of the fluid needed to expand the tube element to a predetermined diameter, said filler block further acting to add rigidity to said inner peripheral surface and said inner interior surface to prevent sagging in a radially outwardly direction of said outer peripheral and outer interior surfaces upon contraction of said tube element.

2. A fluid expandable drum for building a tread and a radial tread ply band in a tire building machine as defined in claim 1 wherein said annular filler block is spaced a predetermined distance from said outer interior surface of said tube element and is positioned to engage said outer interior surface of said tube element when said tube element is contracted.

3. A fluid expandable drum for building a tread and a radial tread ply band in a tire building machine as defined in claim 1 where said annular tube element includes a rubber exterior cover which defines said inner and outer peripheral surfaces and a rubber inner layer which defines said inner and outer interior surfaces, said radial ply being disposed between said rubber exterior cover and said rubber inner layer.

4. A fluid expandable drum for building a tread and a radial tread ply band in a tire building machine as defined in claim 2 wherein said annular tube element includes a rubber exterior cover which defines said inner and outer peripheral surfaces and a rubber inner layer which defines said inner and outer interior surfaces, said radial ply being disposed between said rubber exterior cover and said rubber inner layer.

5. A fluid expandable drum for building a tread and a radial tread ply band in a tire building machine as defined in claim 4 wherein said radial ply band is disposed between said rubber exterior cover defined by said outer peripheral surface and said radial ply, said radial ply band being disposed adjacent said building means to increase the strength and resiliency of the portion of the tube element adjacent said building means without similarly increasing the strength and resiliency of the remaining portion of the tube element.

6. An annular fluid expandable tube element for use with an annular drum for building portions of tires in a tire building machine comprising a lower wall portion having an inner surface and an outer surface adapted to be supported on the drum, an upper wall portion having an inner surface and an outer surface, said upper wall portion being movable radially outwardly from said lower wall portion upon expansion of the tube element and being movable radially toward said lower wall portion upon contraction of said tube element, support means movable with said outer surface of said upper wall portion and defining an annular building surface thereon which is movable in a radial direction away from the drum upon expansion of the tube element to expand the diameter of the building surface to enable a portion of a tire to be built thereon and movable in a radial direction toward the drum upon contraction of the tube element to decrease the diameter of the building surface to enable a built tire portion to be removed therefrom, a radial ply extending around the transverse cross-sectional circumference of the tube element, a radial ply band extending around the circumference of the tube element in the upper wall portion to increase the strength and resiliency of the outer surface of the upper wall portion to enable said support means to decrease the diameter of the building surface upon contraction of the tube element without the need for auxiliary spring means which provide retraction of the support means upon retraction of the tube element and an annular filler block disposed on said inner surface of said lower wall portion for decreasing the volume of said tube element to decrease the volume of the fluid needed to expand the tube element to a predetermined diameter, said filler block further acting to add rigidity to said lower wall portion to prevent sagging in a radially outwardly direction of said upper wall portion upon contraction of said tube element.

7. An annular fluid expandable tube element for use with an annular drum for building portions of tires in a tire building machine as defined in claim 6 wherein said annular filler block is spaced a predetermined distance from said inner surface of said upper wall portion and is positioned to engage said inner surface of said upper wall portion upon contraction of said tube element.

8. An annular fluid expandable tube element for use with an annular drum for building portions of tires in a tire building machine as defined in claim 7 wherein said outer surface of said upper and lower wall portions includes a rubber cover layer and said inner surfaces of said upper and lower wall portions include a further rubber cover layer, said radial ply being disposed between said rubber cover layer and said further rubber cover layer, and said radial ply band being disposed in said upper wall portion adjacent said support means between said rubber cover layer and said radial ply.

* * * * *